Jan. 19, 1954 — A. GORDON — 2,666,740
METHOD FOR PURIFICATION OF SEWAGE
Filed Dec. 4, 1947 — 3 Sheets-Sheet 1
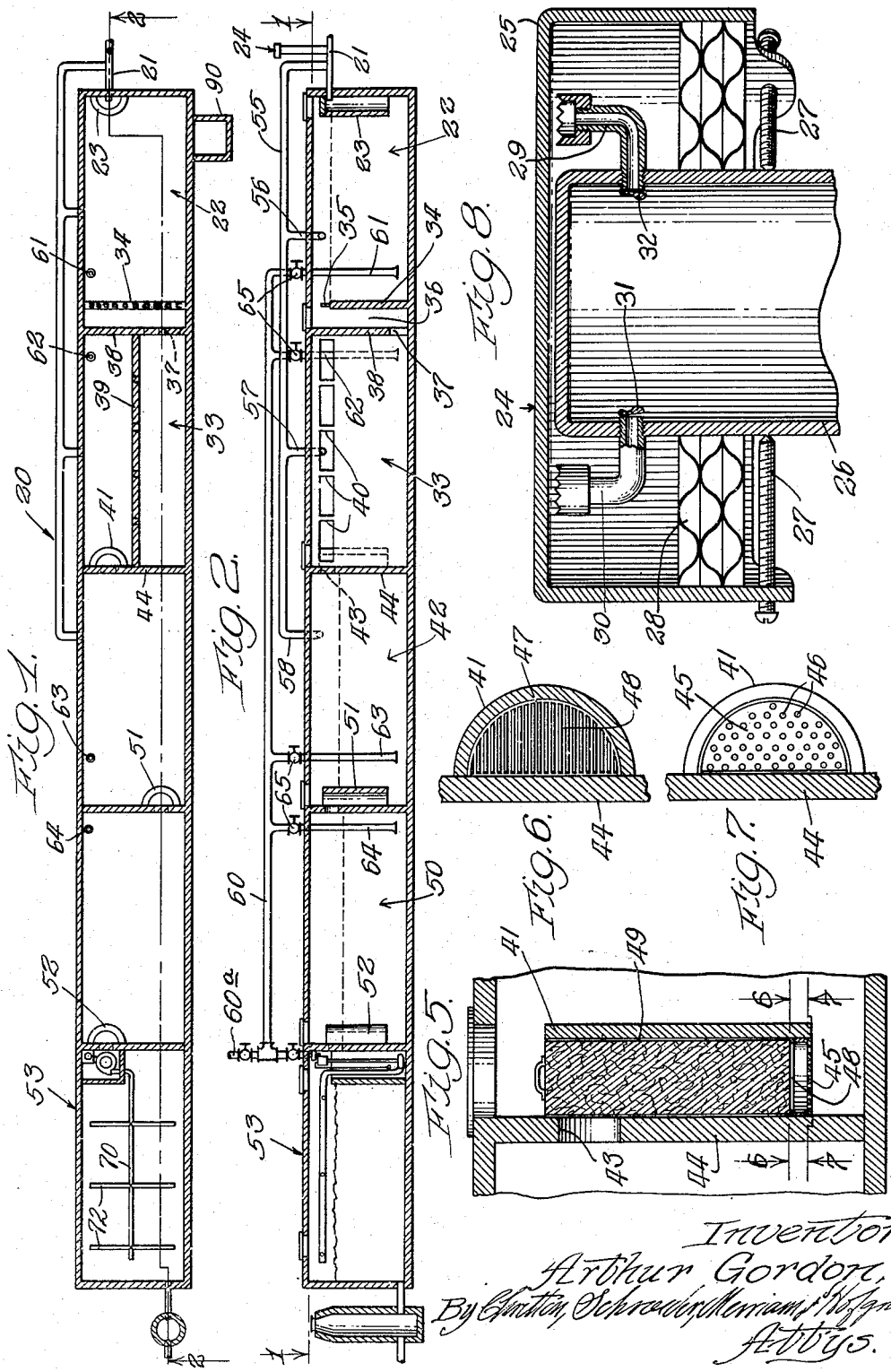

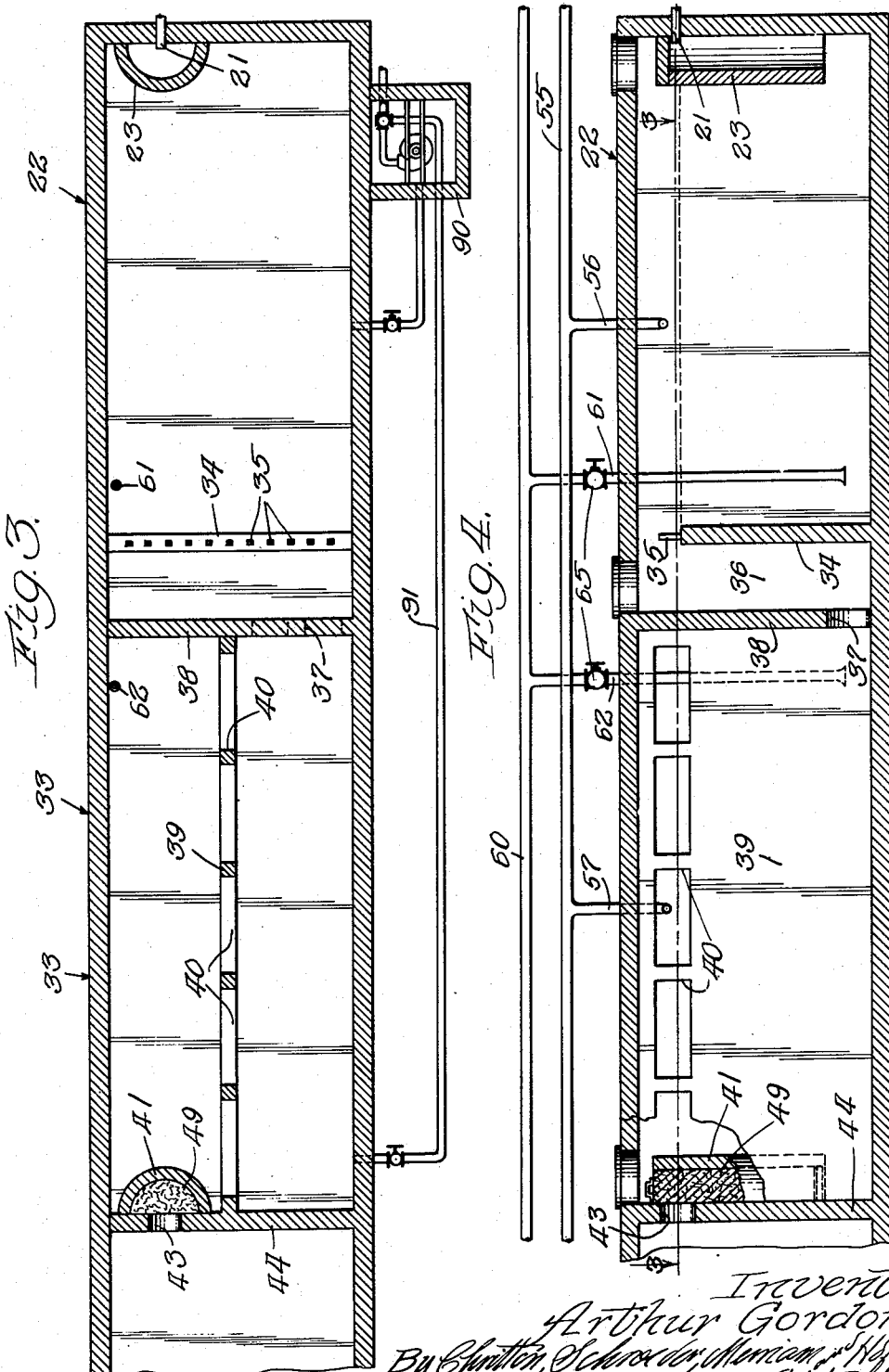

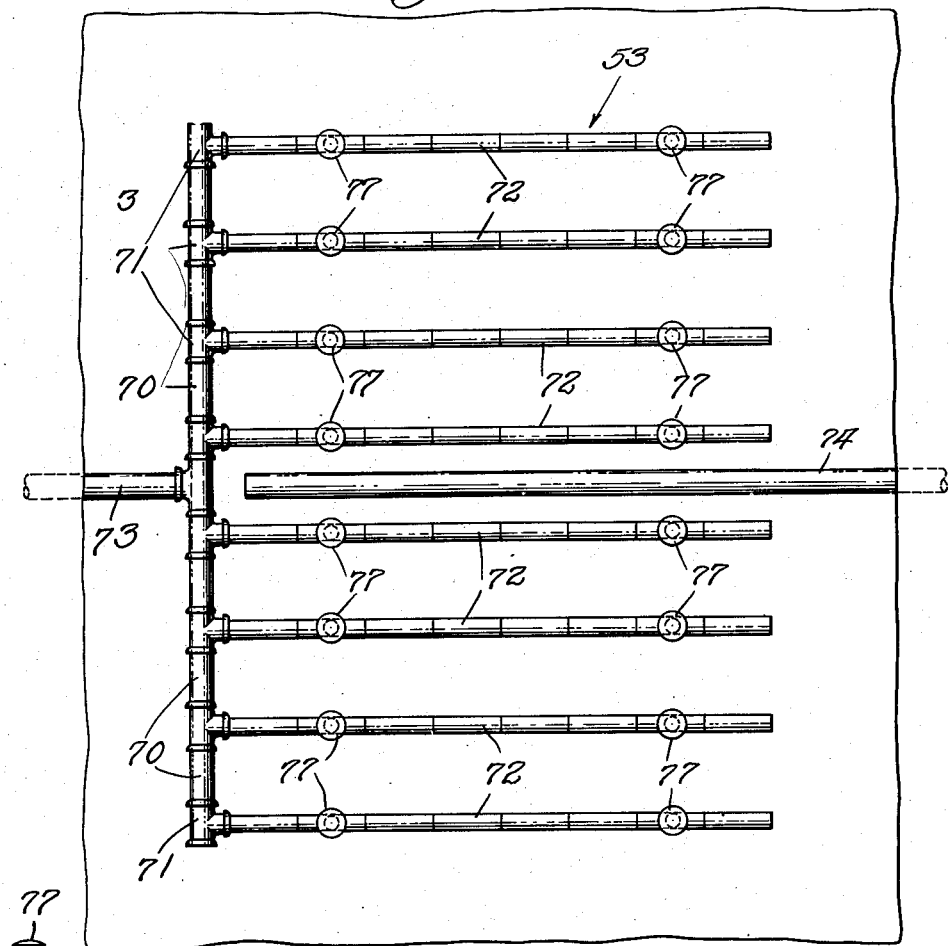
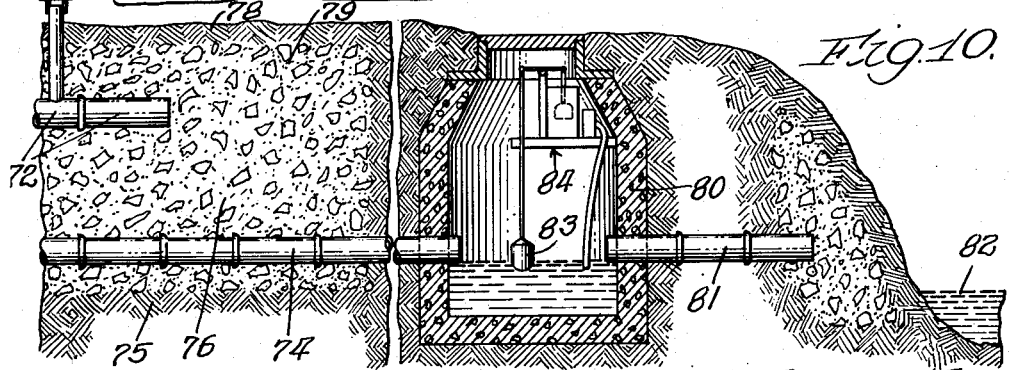

Patented Jan. 19, 1954

2,666,740

UNITED STATES PATENT OFFICE 2,666,740

METHOD FOR PURIFICATION OF SEWAGE

Arthur Gordon, Chicago, Ill.

Application December 4, 1947, Serial No. 789,695

2 Claims. (Cl. 210—2)

This invention relates to a sewage disposal unit and more particularly to a unitary sewage disposal unit adapted to effect complete purification of sewage wastes.

A general object of this invention is to produce a sewage disposal unit of the highest efficiency.

A further object of the invention is to produce a sewage disposal unit in which complete purification of effluent is achieved through natural processes as contrasted to costly mechanical and chemical processes.

A further object of the invention is to produce a sewage disposal unit designed in a manner to enhance bacterial digestion of sewage waste.

Yet another object of the invention is to produce a filter bed designed in a manner to assure complete bacterial digestion of effluent.

Another object of the invention is to produce a sewage disposal unit through which effluent is moved as a mass substantially without intermixture with effluent previously and subsequently discharged into the unit.

Other and further objects of the invention will be apparent from the following description and drawings, in which:

Fig. 1 is a horizontal section through a sewage disposal unit embodying the invention.

Fig. 2 is a vertical section along line 2—2 of Fig. 1.

Fig. 3 is an enlarged view of the right-hand portion of Fig. 1.

Fig. 4 is an enlarged view of the right-hand portion of Fig. 2.

Fig. 5 is a vertical section through a filter connecting one chamber with another chamber, and Figs. 6 and 7 are horizontal sections along lines 6—6 and 7—7 of Fig. 5, respectively.

Fig. 8 is a vertical section through the air inlet.

Fig. 9 is a plan view of the filter bed.

Fig. 10 is a vertical section through the exit portion of the filter bed.

That sewage wastes may be completely purified by biological action has been well known. The conversion of poisonous wastes to pure liquids is carried out for the most part by the action of certain bacteria including particularly aerobic and anaerobic bacteria. These bacteria are present in great abundance in natural soil and have the ability to break down waste matter and convert it to purified material. Certain factors are necessary to promote the growth of these beneficial bacteria. For example, oxygen must necessarily be supplied to the effluent during the early stages of digestion to permit the growth and multiplication of aerobic bacteria which initiate the conversion. The final process of digestion is carried out by anaerobic bacteria which do not need oxygen to live.

My sewage disposal system, hereinafter to be described, has been designed to promote the growth of these microbes and to provide an environment in which they may multiply rapidly and may therefore perform their purification function with speed and efficiency.

The bacteria which first attack effluent are, as previously stated, aerobic bacteria, that is, they require the presence of dissolved oxygen to perform their function and to exist. I have discovered that such bacteria do not flourish in fresh, raw sewage as the raw organic material oxidizes chemically during its first stages of decomposition therefore robbing the effluent of the oxygen necessary for bacterial growth. Accordingly, I provide the entrance end of my sewage disposal unit with at least one and preferably two oxidizing chambers in which the chemical and mechanical breakdown of the raw effluent occurs. However, under favorable conditions the presence of aerobic bacteria may be detected in the first chamber and appear in increasing numbers in the second.

Referring to the drawings (which are diagrammatic in nature), the sewage disposal unit 20 receives effluent through an inlet pipe 21 which discharges sewage into the bottom of the first oxidizing chamber 22, the effluent being diverted toward the bottom by a baffle plate 23. While effluent generally contains a substantial portion of dissolved oxygen, I prefer to augment the supply of oxygen by entraining air in the stream of incoming sewage. I therefore provide an air intake 24 on the pipe 21, the air intake comprising (see Fig. 8) a cover 25 secured to an inlet pipe 26 by means of the bolts 27, the cover being provided with a filter 28 of usual construction. The pipe 26 opens to the pipe 21, air being admitted to the pipe 26 through the small inlet pipes 29 and 30. The pipes are of the suction breaker type being provided with flap valves 31 and 32. In the event that noxious gases should build up within the oxidizing chambers, the exit of such gases to the atmosphere is prevented by the last named valves.

The first oxidizing chamber 22 and the second oxidizing chamber 33 are each constructed to have a volume capacity substantially greater than the normal total amount of effluent received in a twenty-four hour period. The balance of the chambers, that is, the inoculation chambers 42 and 50 hereinafter to be described have a volume capacity substantially equal to the total amount of effluent received in a normal twenty-four hour period for reasons hereinafter to be described.

Adjacent the exit end of the first oxidizing chamber 22 is an upstanding wall 34 having a foraminous top 35 through which the effluent passes upon overflowing of chamber 22 with the addition of fresh waste from the inlet 21. After passing through the foraminous top 35 the effluent passes downwardly through a passageway 36 and through an opening 37 at the bottom and one side of an end wall 38 of the second oxidizing chamber 33.

It will be noted that incoming sewage is directed to the bottom of the chamber 22 and leaves that chamber from the top of the opposite end thereof. In operation, the heavier solid material will settle to the bottom of this chamber. Were it not for the fact that I direct the flow in the manner just described, the settled solids would rapidly use up the available oxygen and would then proceed to decompose and putrify rather than to oxidize chemically. Such decomposed solid material not only tends to clog the ordinary sewage disposal plant but gives rise to noxious odors. In my system it can be seen that oxygen entrained in the incoming effluent is directed into and under the settled solids by the baffle plate 23 and the air bubbles trickling upward through the solids provide a continuous supply of oxygen to the solids. Upon becoming oxidized, the solids will tend to break down and become suspended in the liquid within the chamber. The passage of solids through the foraminous top 35 tends to assist in the breakdown of solids by the mechanical action of the openings therein. The entire flow in the chamber 22 and in the subsequent chamber 23 is directed toward the exit from each of those chambers, with the entrance being at the lower portion of one end and the exit at the upper portion of the opposite end. All of the effluent within each container flows as a unit toward the exit without areas of stagnation. The unit has graduated velocities with the most rapid in the purely liquid effluent and the least rapid in the heavier solids. The flow, however, may be considered as mass flow, substantially without turbulence and without intermixture with effluent previously or subsequently discharged into the chamber.

The chamber 33 is divided into two equal parts by a wall 39 extending longitudinally thereof, the wall being provided with a plurality of openings 40 through which the effluent passes in passing from the entrance side of the chamber to the exit side thereof.

From the second half of the oxidizing chamber 33, effluent passes upwardly through a filter 41 and enters the top portion of a third chamber 42 through an opening 43 in the end wall 44 thereof. The filter extends above the opening 43 to prevent effluent within the chamber 42 from flowing directly into the opening and, as shown best in Figs. 5, 6 and 7, has a bottom plate 45 with a plurality of holes 46 therein. Immediately above the bottom plate is a second plate 47 having a grating 48 therein through which the effluent passes upwardly through a filtering medium 49 and thence through the opening 43.

The third chamber 42 together with the fourth chamber 50, I choose to call inoculation chambers for it is in these latter chambers that the effluent first begins to show the presence of aerobic bacteria in any material quantity. It will be noted that the chamber 42 is provided with a filter 51 at its exit similar to the filter 41 and that effluent leaves the chamber 42 at the bottom thereof, entering the chamber 50 at its top. In exiting from the chamber 50 the effluent passes through a third filter 52 into a filter bed 53 hereinafter to be described.

The filters 41, 51 and 52 are provided with the gratings and foraminous plates hereinbefore described in order that I may control the volume of effluent flowing into each of the inoculation chambers. As previously stated, the inoculation chambers 42 and 50 have a capacity substantially equal to the normal amount of effluent received in a twenty-four hour period while the oxidizing chambers 22 and 33 each have a volume capacity somewhat greater than the expected daily volume. The filters are designed to restrict the volume of effluent flowing into each of the chambers 42 and 50 and to limit that volume so that no more than a predetermined amount of effluent is permitted to enter the inoculation chambers in any twenty-four hour period. For example, if the inoculation chambers were each designed to contain 24,000 gallons of effluent, the filters 41 and 51 are designed to pass a maximum of 1,000 gallons per hour. Thus, if an unexpectedly heavy load of effluent were introduced to the oxidation chambers, the excess would not be permitted to enter the inoculation chambers and would remain in the oxidizing chambers until normal operation was restored. In other words I make certain that effluent remains within each of the inoculation chambers for a period of at least twenty-four hours and it is impossible to flush the entire system by an unexpected load. The capacity of each of the oxidizing chambers in excess of the normal expected twenty-four hour volume may readily be determined. If my system is built to accommodate a considerable number of individuals, for example, a small town of 5,000 or 10,000, the variations in daily flow will be split and therefore but little excess capacity need be given to the oxidizing chambers. My sewage disposal system is readily adaptable for family use and when serving a family, say of four, proportionately higher excess capacity must be given to the oxidizing chambers because of the possibilities of considerable variance in daily flow.

Each of the inoculation chambers just described has a capacity approximately equal to one day's flow of effluent. Therefore, the effluent in each of these chambers is given a period of rest, generally occurring from about 11 p. m. until 6 a. m. the following morning, during which oxidation and inoculation occur at an accelerated pace. Furthermore, the growth of aerobic bacteria in the inoculation chambers is not inhibited by the introduction thereto of fresh, unoxidized waste material. Oxidation of organic waste material which prevents the multiplication of aerobic bacteria is substantially completed in the oxidation chambers 22 and 33 in the forty-eight hour period preceding the entrance of the effluent into the chambers 42 and 50 under normal conditions. The heavy unoxidized solids settling in the chambers 22 and 33 of course remain therein somewhat longer than forty-eight hours while being broken down in the manner hereinbefore described.

Further air as needed may be supplied to the chambers 22, 33 and 42 and any gas pressure which may develop in these chambers may be released by means of the air vent 55 which is connected by pipes 56, 57 and 58 to the chambers just named. Additional air may be furnished to the chambers through the medium of the pipe system 60 which is connected to all four chambers by means of the risers 61, 62, 63 and 64 as shown, if found desirable. For this purpose the pipe system 60 may be connected to a source of air under pressure by means of the pipe 60a controlled by the valve means shown. The principal purpose of the pipe system 60, however, is to provide means for periodically flushing the entire system by connecting the pipe 60 to a source of water. Each of the riser pipes is provided with a check valve 65. These valves are so designed as to prevent siphoning or backing up of the effluent into the water supply system and consequent spread of disease. In exceedingly cold weather the entire unit may be heated by introducing warm water into the system through the pipes 60.

One of the most important features of that part of my disposal system which I have heretofore described is that the effluent, in passing through the various chambers, flows for the most part as a unit or as a single mass. The velocity of flow may graduate from top to bottom, especially in the oxidizing chambers where the settled solids move more slowly than liquids and suspended solids, but the entire mass moves toward the exit to the chamber next lower in the connected series. For the most part, therefore, each day's discharge of effluent passes as a unit through the entire system of chambers without substantial intermixture with effluent discharged the previous or the subsequent day. A considerable portion of the organic solids in the effluent will be in suspended form and will pass from chamber to chamber at the same velocity as the liquid, while other portions of the solids will settle, principally in the first two chambers. As oxidation of the settled solids proceeds in the first two chambers the entire layer of solids along the bottoms of these chambers is moved towards the exit end. In other words, as fresh waste matter is introduced to the disposal unit, the settled solids are forced along the bottoms of the chambers toward the exit end and into the exit and therefore into the next chamber. In addition oxygen entrained in the incoming stream is introduced into the settled sludge. Further settling takes place in the second oxidation chamber but to a markedly lesser degree than occurred in the first chamber. To take care of solids which are not substantially completely broken up in the manner first described, I provide a pump 90 connected to chambers 22 and 33 by the pipe line 91. Excess solids in the chamber 33 may be recirculated through chamber 22 by means of the pump until their breakdown is complete. By the time the effluent reaches the first inoculation chamber the solid material is in suspended form having been reduced to a finely divided condition by the action just described together with the mechanical action of the foraminous plate 35 and the passageways 40 through which the material has been passed.

Contrary to many opinions, I have discovered that oxidation and bacterial digestion take place more rapidly and more efficiently if agitation is avoided within the chambers. With the arrangement shown I find that no turbulence occurs in the various chambers even with a rather heavy flow of sewage.

From the chamber 50 the effluent is introduced to the filter bed 53, indicated diagrammatically in Figs. 1 and 2 and shown in detail in Figs. 9 and 10. The filter bed should be enclosed and may be located either above or below the surface of the earth. I prefer to have the entire filter bed located beneath the surface of the ground and covered with a layer of soil to eliminate objectionable odors and the multiplication of insect life, particularly flies, with the consequent danger of spread of disease. The particular size of the filter bed depends upon the number of persons it is expected to serve and upon the climate prevailing at the site of the installation. The important part is that the size should be such as to permit retention of the effluent in the bed until complete bacterial digestion occurs. Accordingly an opening of proper size is made in the ground where the filter bed is to be positioned and a header pipe 70 laid therein having a plurality of T-joints 71 connected to porous tile pipes 72. The header 71 receives the effluent from a pipe 73 connected to the last inoculation chamber while the filtered and completely digested effluent is discharged from the filter bed by means of the pipe 74.

In constructing the filter bed, a mixture 75 of slag and limestone is placed in the hole over which the exit pipe 74 is placed. A second layer 76 of the mixture is placed over the pipe 74. On this layer the pipes 72 are laid and covered with another layer 79 of limestone and slag. A covering of dirt 78 completes the installation. Air vent pipes 77 connect the buried pipes 72 to the atmosphere.

If the soil in which the filter bed is laid is composed of impervious matter, such as rock or clay, no further addition to the filter bed is necessary. If, however, the soil is porous, such as a sand or a sandy loam, it is essential that a guard wall of concrete be placed around the filter bed to prevent seepage of undigested waste matter into the surrounding soil. In a semi-porous clay soil, the bed may be made larger than necessary for bacterial digestion to prevent seepage.

The exit pipe 74 empties into a receiving basin 80 from whence it flows through a pipe 81 into a water course 82 or into some other means of disposing of the final purified liquid. The basin is provided with a float 83 which automatically controls a mechanism 84 for introducing chemical bactericides into the liquid as required by the rate of flow. The need for the basin is mainly a statutory one, that is, is required by law, for I have found that bacterial digestion is so complete in the apparatus I have just described as to render such additional precautions unnecessary, or at least necessary only in unusual circumstances or under conditions of unanticipated increase in flow of effluent.

The particular materials chosen for the filter bed and the particular manner in which it is constructed is important. First, to encourage the growth of bacteria which have the power to digest sewage it is necessary that an alkaline media be supplied. The limestone performs this function of alkalizing the sewage. I have found that slag is particularly adaptable for use in the bed as its honey-combed structure provides countless openings in which are formed innumerable pools of sewage liquid. In each of these pools bacterial digestion may take place rapidly and with the highest efficiency.

The effluent, as it enters the filter bed, contains a considerable amount of dissolved oxygen and therefore in the upper layers of the bed the growth of aerobic bacteria which break down the oxidized organic matter into nitrites is not inhibited. Further air is admitted into the filter bed by the pipes 71. The final breakdown of nitrites into nitrates is carried on in the lower layers of the bed by anaerobic bacteria which live and thrive in the absence of oxygen. Completely digested sewage drains off as a pure, clear liquid into the pipe 74.

While I have shown and described my invention in one embodiment, it is to be understood that it is capable of many modifications. Changes, therefore, in the construction and arrangement may be made without departing from the spirit and scope of the invention as disclosed in the appended claims.

I claim as my invention:

1. The method for providing for bacterial purification of sewage which comprises introducing a first mass of effluent containing both liquid and solid matter discharged during a period into a first zone, entraining oxygen in the introduced effluent, moving substantially all of the liquid and suspended solid portion of the effluent into a second zone and filtering oxygen upwardly through settled solids in the first zone by introducing effluent containing entrained oxygen into the lower portions of the first zone during approximately the first succeeding period to form a second mass of effluent therein, moving substantially all of the liquid and suspended solid portions of the first and second masses of effluent into a third and second zone respectively and filtering oxygen upwardly through settled solids in the first zone by introducing effluent containing entrained oxygen into the lower portion of said first zone during approximately the second succeeding period to form a third mass of effluent therein, and then removing liquid and suspended solid effluent from the third zone and discharging the last mentioned effluent into a filter bed by introducing effluent into the first zone.

2. The method for providing for bacterial purification of sewage which comprises introducing a first mass of effluent containing entrained oxygen and both liquid and solid matter discharged during a period of approximately twenty-four hours into a first zone, moving substantially all of the liquid and suspended solid portion of the effluent into a second zone and filtering oxygen upwardly through settled solids in the first zone by introducing effluent containing entrained oxygen into the lower portion of the first zone during approximately the first succeeding twenty-four hours to form a second mass of effluent therein, maintaining unsuspended solids in said first zone until sufficiently broken down as to be suspended in the effluent, moving substantially all of the liquid and suspended solid portions of the first and second masses of effluent into a third and second zone respectively and filtering oxygen upwardly through settled solids in the first zone by introducing effluent containing entrained oxygen into the lower portion of said first zone during approximately the second succeeding twenty-four hours to form a third mass of effluent therein, moving substantially all of the liquid and suspended solid portions of the first, second and third masses of effluent into a fourth, third and second zone respectively and filtering oxygen upwardly through settled solids in the first zone by introducing effluent containing entrained oxygen into the lower portion of said first zone during the third succeeding twenty-four hours to form a fourth mass of effluent therein, maintaining aerobic conditions in said third and fourth zones and then removing liquid and suspended solid effluent from the fourth mass and discharging the last mentioned effluent into a filter bed by introducing effluent into the first zone.

ARTHUR GORDON.

References Cited in the file of this patent

UNITED STATES PATENTS

| Number | Name | Date |
|---|---|---|
| 853,217 | Bordigoni | May 14, 1907 |
| 1,223,427 | Scarborough | Apr. 24, 1917 |
| 1,323,256 | Dieterle | Dec. 2, 1919 |
| 1,685,300 | Travers | Sept. 25, 1928 |
| 1,685,301 | Travers | Sept. 25, 1928 |
| 1,738,521 | Bomhoff | Dec. 10, 1929 |

FOREIGN PATENTS

| Number | Country | Date |
|---|---|---|
| 12,489 | Great Britain | of 1898 |
| 450,422 | Great Britain | July 17, 1936 |

OTHER REFERENCES

Hardenbergh, Home Sewage Disposal, published 1924 by J. B. Lippincott Co., Philadelphia, Pa.; pages 140 to 145 and 149 cited.

Kinnicutt et al., Sewage Disposal, published 1919 by John Wiley and Sons, Inc., New York, N. Y.; pages 152 to 154 cited.